MICHAEL N. SWIERBUT
LOUIS J. SILKO
*Inventors*

*Attorney*

April 6, 1965    M. N. SWIERBUT ETAL    3,176,435
MACHINE FOR SHAPING THE END PERIPHERY OF
SUBSTANTIALLY CYLINDRICAL OBJECTS
Filed Nov. 13, 1961    3 Sheets-Sheet 3

MICHAEL N. SWIERBUT
LOUIS J. SILKO
*Inventor*

*Attorney*

United States Patent Office 3,176,435
Patented Apr. 6, 1965

3,176,435
MACHINE FOR SHAPING THE END PERIPHERY
OF SUBSTANTIALLY CYLINDRICAL OBJECTS
Michael N. Swierbut, 1816 Lynn Lane NW., Grand
Rapids, Mich., and Louis J. Silko, Coral, Mich.
Filed Nov. 13, 1961, Ser. No. 151,922
3 Claims. (Cl. 51—138)

This invention provides a specialized machine for shaping the ends of substantially cylindrical objects into an annular beveled or rounded surface. The preferred form has been developed to bevel the ends of short helical springs previously machined to terminate in a plane perpendicular to the axis of the spring. Spring stock is a relatively hard and tough material, and the resilience that makes it useful as a spring has the side-effect of making it extremely difficult to hold with sufficient security to perform conventional machining operations upon it without chattering or distortion. Applicant has found that the cutting operation can be performed successfully by an abrasive belt system, when used in conjunction with a novel mechanism for handling and positioning the springs with respect to the cutting belt.

It is preferable that the mechanism for handling the springs should be provided with a hopper device of conventional design for providing a supply of oriented springs ready for insertion in the conveying portion of the device, although the insertion may be done manually. The preferred form of the conveyor is based upon a wheel having its periphery notched out to receive the springs to a depth slightly less than the outside diameter of the springs. A charging mechanism is provided for inserting a single spring from the hopper supply in each of the notches as it passes the charging station. A fixed tape under tension is positioned to contact the portion of the periphery of the springs which projects outward from the conveying wheel to induce a rotation of the springs within the notches with respect to the wheel as the wheel rotates. A moving abrasive belt is appropriately positioned in the path of movement of the springs to engage the end surfaces over a sufficient length of path to result in forming the ends in a substantially annular configuration. The relatively gentle engagement of the abrasive belt with the springs avoids chattering and strain in the machine. When the springs are to be machined on both ends, the cutting equipment is preferably installed at two successive stations. A fixed backing plate over the sector of the conveyor wheel on which the spring is being operated upon prevents the springs from moving axially within the notches as a result of the pressure of the belt. Belt pressure can be controlled by this invention without such increase in the tension in the abrasive belt itself as to interfere with its wearing qualities. The several details of the invention will be analyzed further through a discussion of the particular embodiment illustrated in the accompanying drawings.

In the drawings:

FIGURE 1 presents a perspective elevation of a device embodying the preferred form of the machine.

Figure 1:
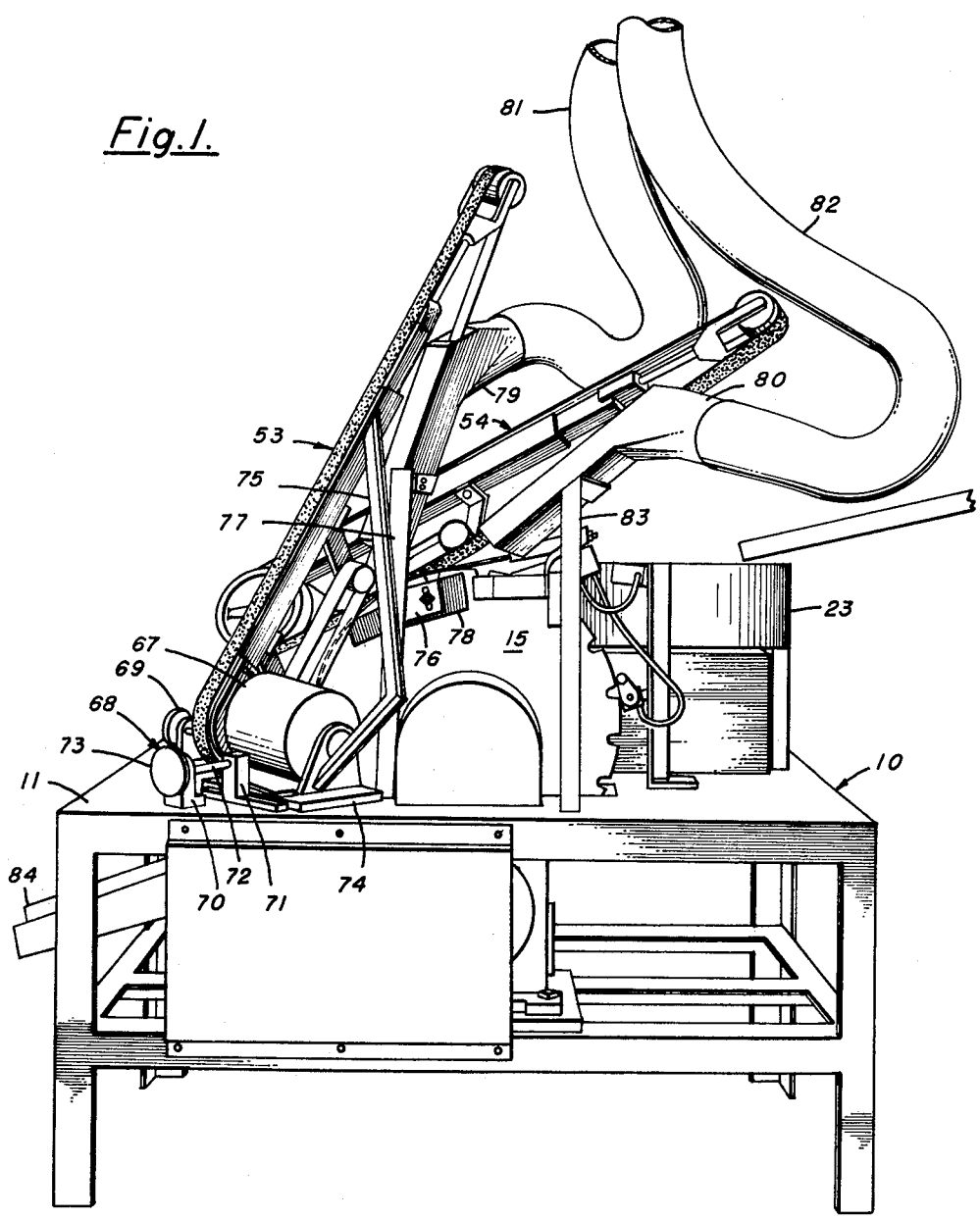
Figure 2:
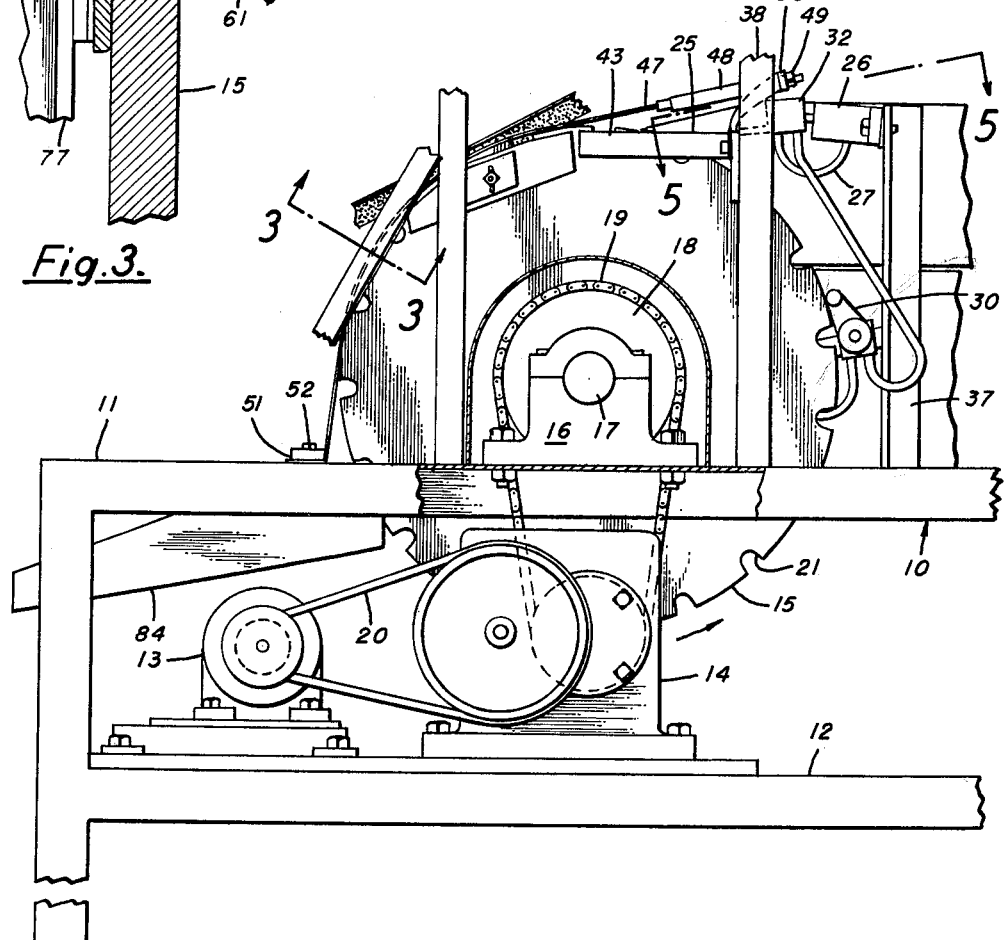
FIGURE 2 is a side elevation primarily of the conveyor portion of the device shown in FIGURE 1.

Referring to the drawings, a frame indicated generally at 10 includes a table-like structure having a top surface 11 for supporting the principal components of the structure, and a lower structure 12 for accommodating a motor 13 and a geared speed-reducer 14 used to drive the conveying wheel 15. An opposite pair of bearing blocks, one of which is indicated at 16, is mounted on the surface 11, and securely bolted thereto as shown. The shaft 17 carries the conveyor wheel 15 in a rotatable mounting with respect to the frame 10. The sprocket 18 is also fixed with respect to the shaft 17, and is engaged by the chain 19 driven by the speed reducer 14. Power is transferred from the motor 13 over to the geared unit 14 by the conventional belt 20.

Figure 4:
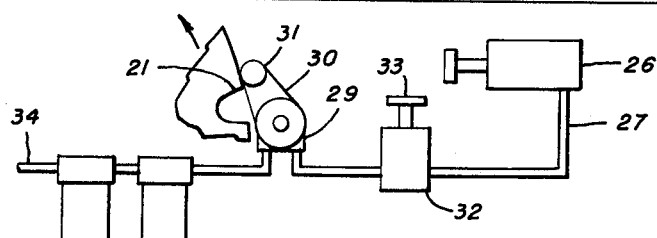
FIGURE 4 is a schematic view showing the control system for the charging device.
Figure 5:
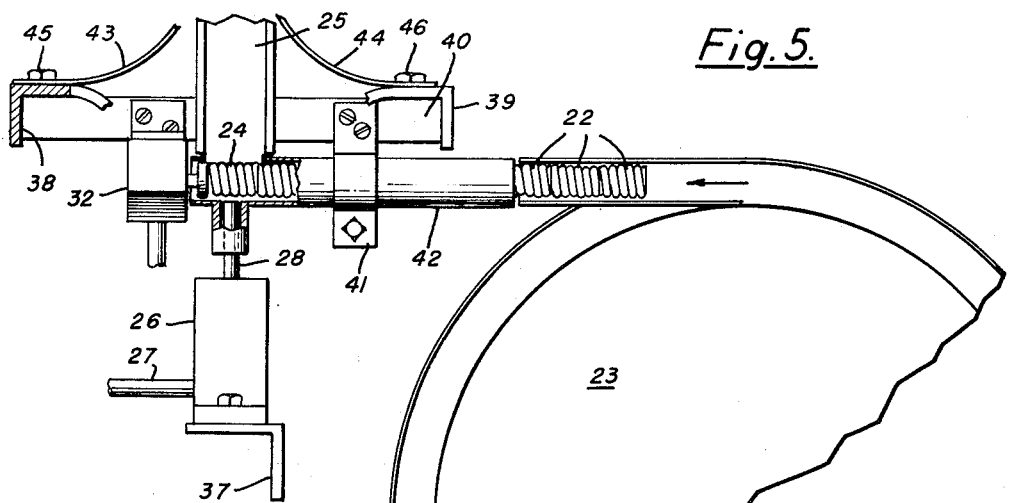
FIGURE 5 is a section on an enlarged scale taken on the plane 5—5 of FIGURE 2.

The conveyor wheel 15 is provided with a group of evenly-spaced notches or recesses 21 around its periphery for receiving one of the springs 22 at a time. These springs are inserted in the recesses 21 by the charging device shown in FIGURE 5. The conventional hopper 23 (which forms no part of this invention) supplies an oriented group of springs 22 having a direction of flow as indicated by the arrow. These springs reach a terminal position occupied in FIGURE 5 by a spring 24 opposite the chute 25. The ram device 26 is provided with compressed air through the conduit 27, and the piston rod 28 will shove the spring 24 out into the trough 25 upon actuation of the ram device. This actuation is controlled by the valve 29 operated by the radius arm 30, which has the end 31 adapted to enter each of the recesses 21 as they pass in the direction of the arrow in FIGURE 4. In order for the ram 26 to operate, the safety device 32 must be urged to the left, as shown in FIGURE 5, by the pressure of the line of oriented springs 22. The safety device 32 is essentially a normally-closed shut-off valve, which is opened by pressure against the head 33. The most important function of the safety device is to prevent the actuation of the ram 26 when the spring has not quite reached the position of the spring 24, which might cause the device to jam. The compressed air system associated with the ram 26 includes a supply line 34, and a conventional filter and lubricator indicated at 35 and 36.

The ram 26 is supported on a column 37 secured in any convenient fashion to the surface 11 of the frame 10. The safety device 32 and the structure associated with the chute 25 are also conveniently supported on vertical columns 38 and 39. The short horizontal beam 40 extends between the columns 38 and 39, and provides support for a bracket 41 carrying the terminal tube 42 of the hopper system, and also providing support for the safety unit 32. A pair of guide pieces 43 and 44 are secured respectively to the columns 38 and 39 by the bolts 45 and 46, and these members extend along and beyond the chute 25 to resiliently place the springs 22 axially within the recesses 21 for engagement with the successive components.

To retain the springs within the recesses and to induce a rotation of the springs with respect to the conveyor wheel 15, a tape 47 is kept under tension by the adjustable terminal 48 controlled by the nut 49 acting against a bracket 50 secured to the columns 38 and 39. The opposite extremity of the tape 47 terminates at the surface 11 of the frame 10, where it is held by a member 51 positioned by the bolt 52 engaging the structure of the frame 10. The friction of the engagement of the tape 47 with the periphery of the springs will induce a rotation with respect to the wheel which will bring successive portions of the ends of the spring into engagement with the abrasive belt of the cutting mechanism to generate a beveled end surface.

Figure 6:
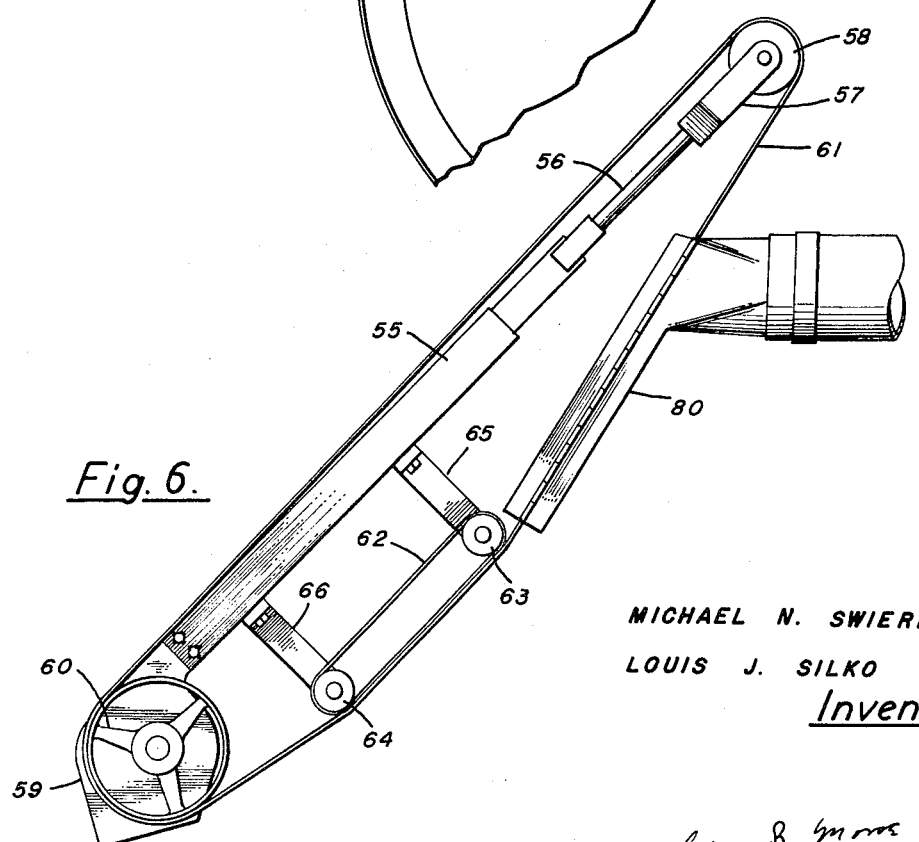
FIGURE 6 is a side elevation of one of the abrasive belt systems shown in the machine assembly of FIGURE 1.

The machine illustrated in FIGURE 1 operates upon the opposite ends of the spring, and therefore involves two cutting devices which are indicated generally at 53 and 54. These are of essentially the same construction, which is best shown in detail in FIGURE 6. A sub-frame for carrying the abrasive belt system includes the extensible beam 55 having an inner telescoping portion 56 terminating in the bracket 57 for supporting the idler pulley 58. The outer portion of the extensible beam 55 is fixed with respect to the mounting plate 59, which rotatably supports the driving pulley 60. The abrasive belt 61 is positioned by the driving pulley 60 and the idler 58, and also by the auxiliary pulleys 63 and 64 which are respectively rotatably mounted on the struts 65 and 66 secured to the extensible beam 55. This arrangement is notable for the fact that the auxiliary belt 62 may be of extremely strong material, and a very high degree of tension may be maintained in it. Since it moves as a result of the frictional engagement with the block of the abrasive belt 61, the result is to apply a very substantial support to the abrasive belt without raising the tension in the abrasive belt beyond that which is desirable for long wear. The length of engagement of the belt 62 with the abrasive belt 61 is sufficient to cover the distance with which the abrasive belt is in engagement with the ends of the springs for the completion of the machining operation. A driving motor 67 is associated with each of the cutting units 53 and 54, and it is preferable that the mounting plates 59 and the supporting brackets for the motor be secured together so that they may be moved with respect to the table surface 11 as a unit by the adjusting mechanism shown at 68 for the cutting device 53, and the similar adjusting mechanism 69 for the cutting device 54. Each of the adjusting mechanisms includes a bracket 70 which is fixed with respect to the frame 10, and a base unit including the vertical block 71 having threaded engagement with a bolt 72 controlled by the wheel 73. Manipulation of the wheel 73 will induce sliding movement of the entire assembly including the motor and the cutting mechanism within parallel guideways, one portion of which is indicated at 74 in FIGURE 1. Suitable braces as indicated at 75 may be incorporated to stabilize the upper portion of the cutting mechanism.

Figure 3:
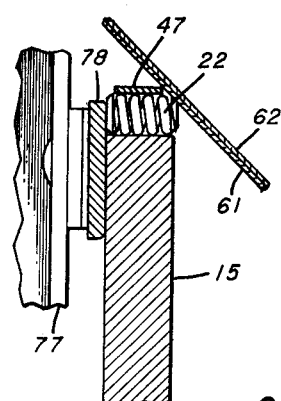
FIGURE 3 is a section on an enlarged scale on the plane 3—3 of FIGURE 2.

Since the two cutting mechanisms 53 and 54 must operate at slightly different sectors with respect to the conveyor wheel 15 in order to avoid interference, an arrangement must be provided to supply some form of backing support at the opposite ends of the springs to counteract the belt pressure. Brackets as indicated at 76 are secured to columns 77 for adjustably supporting the backing plates 78, which occupy the entire sector on the opposite side of the respective cutting mechanisms over which the abrasive belts engage the workpieces. This relationship is best shown in FIGURE 3. This arrangement is preferable to attempting to position both belt devices to operate over the same sector, and oppose the pressure of one by that of the other.

It is preferable to incorporate in conjunction with each of the cutting mechanisms a system for collecting the dust resulting from the engagement of the abrasive belts with the workpieces. This arrangement is more or less conventional, and includes the shrouds 79 and 80 which serve as suction ducts, and which are connected to the vacuum hoses 81 and 82, as shown in FIGURE 1. The ducts are conveniently supported on struts as indicated at 83, or any convenient adjacent structure may be extended for this purpose.

When the springs 22 have been carried by the conveyor wheel 15 through the sectors of operation of the units 53 and 54, they move into an area where they are not held by the tape 47. They are then free to drop out of the recesses 21 into the discharge trough 84 mounted in any convenient manner on the frame 10.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:

1. A machine for beveling the ends of substantially cylindrical objects, said machine comprising:
   a frame;
   a wheel rotatably mounted in said frame and having a plurality of peripheral recesses;
   means for inserting workpieces in said recesses including
      a hopper device for providing a supply of oriented workpieces at a charging station,
      ram means mounted on said frame at said charging station for urging one workpiece at a time from said supply into position for entrance into said recesses, and control means for said ram means to actuate the same in timed relationship to the movement of said recesses;
   peripheral bearing means engaging the outer extremity of said workpieces being carried by said recesses to rotate said workpieces with respect to said wheel,
      said peripheral bearing means including a tape under tension, and substantially fixed with respect to said frame, said recesses being of a selected depth to cause said workpieces to project beyond the periphery of said wheel;
   and cutting means mounted on said frame for operating on the ends of said workpieces carried by said recesses,
      said cutting means each including a sub-frame,
      pulley means mounted at spaced points on said sub-frame,
      abrasive belt means engaging said pulley means,
      auxiliary pulley means mounted on said sub-frame adjacent the path of a portion of said abrasive belt means, and reinforcement belt means engaging said auxiliary pulley means.

2. A machine for beveling the ends of substantially cylindrical objects, said machine comprising:
   a frame;
   a wheel rotatably mounted in said frame and having a plurality of peripheral recesses;
   means for inserting workpieces in said recesses;
   peripheral bearing means engaging the outer extremity of said workpieces being carried by said recesses to rotate said workpieces with respect to said wheel,
      said peripheral bearing means including a tape under tension, and substantially fixed with respect to said frame, said recesses being of a selected depth to cause said workpieces to project beyond the periphery of said wheel;
   and cutting means mounted on said frame for operating on the ends of said workpieces carried by said recesses,
      said cutting means each including a sub-frame,
      pulley means mounted at spaced points on said sub-frame, and
      abrasive belt means engaging said pulley means.

3. A machine for beveling the ends of substantially cylindrical objects, said machine comprising:
   a frame;
   a wheel rotatably mounted in said frame and having a plurality of peripheral recesses for receiving therein a plurality of workpieces;
   peripheral bearing means engaging the outer extremity of said workpieces being carried by said recesses to rotate said workpieces with respect to said wheel, said peripheral bearing means including a tape under tension, and substantially fixed with respect to said frame, said recesses being of a selected depth to cause said workpieces to project beyond the periphery of said wheel;

and cutting means mounted on said frame for operating on the ends of said workpieces carried by said recesses.

References Cited in the file of this patent

UNITED STATES PATENTS

| | | |
|---|---|---|
| 1,594,445 | Blevney | Aug. 3, 1926 |
| 2,122,942 | Hutchinson | July 5, 1938 |
| 2,328,809 | Johnson | Sept. 7, 1943 |
| 2,489,811 | Perkins | Nov. 29, 1949 |
| 2,795,090 | Sterna | June 11, 1957 |

FOREIGN PATENTS

| | | |
|---|---|---|
| 296,570 | Canada | Jan. 14, 1930 |